Patented Dec. 15, 1953

2,662,837

UNITED STATES PATENT OFFICE 2,662,837

COMPOSITION AND METHOD FOR REMOVING HARDENED SILICONE RESIN GLAZES FROM METAL SURFACES

Ira J. Duncan, Detroit, Mich., assignor to Detrex Corporation, Detroit, Mich., a corporation of Michigan No Drawing. Application February 19, 1949, Serial No. 77,441

9 Claims. (Cl. 134—29)

This invention relates to compositions and methods for removing hardened silicone resin glazes from metal surfaces and more particularly relates to compositions containing an alkali metal base, a chlorinated hydrocarbon and a co-solvent therefor and to a process which comprises contacting the silicone resin with the aforementioned composition and removing said silicone resin from its associated metallic surface by rinsing with water.

The silicone resins removed by the processes and compositions of this invention are long-chain polymers quite different physically and chemically from silicone greases and similar short-chain silicone polymers of relatively low molecular weight. Various references are found in the patent literature and in other literature to the effect that compositions containing an alkali metal hydroxide and an alcohol are effective in dissolving silicone resins, but upon following such teachings in an attempt to dissolve long-chain hardened or baked silicone resin glazes it has been found either that no reaction takes place or that the reaction is too slow to permit any practical use in industry unless a mixture containing a dangerously high percentage of corrosive caustic soda is used. Even in the latter case the resin removal is incomplete and vigorous application of mechanical force is needed to remove the residual glaze. Several references mention the solubility of silicone resins in various solvents such as benzene, toluene, ethers, gasoline and oils such as soya bean oil or linseed oil, but these too are necessarily restricted to the silicone resins of lower molecular weight since the hardened or baked silicone resin glazes have been found to resist the action of any of the aforementioned compositions.

It is therefore an object of this invention to remove a hardened or baked silicone resin glaze of high molecular weight from an associated surface. It is a further object to provide a harmless, non-corrosive composition for converting an insoluble hardened or baked silicone glaze of high molecular weight to a composition easily removed with water. A still further object of the invention is to provide a process for removing such a silicone resin glaze without exerting undue mechanical force. Other objects will appear hereinafter.

The foregoing and other objects are attained by the novel combination of an alkali metal base, a chlorinated hydrocarbon, and a co-solvent for said alkali metal base and chlorinated hydrocarbon. When a long-chain silicone polymer is contacted with the inventive composition, a physical or chemical change takes place in the resin by which the resin is made easily removable from the associated surface by rinsing with water.

The term "alkali metal base" as used in the description of this invention is meant to include the basic compounds of the metals sodium, potassium, lithium, rubidium, caesium and the like, including the hydroxides, oxides, alcoholates and their equivalents.

The chlorinated hydrocarbons which comprise another component in compositions of this invention are either partially chlorinated or fully chlorinated hydrocarbons of the group which includes methylene chloride, carbon tetrachloride, and perchlorethylene. Methylene chloride has the formula $CH_2Cl_2$ and is a colorless liquid boiling at 42° C. Carbon tetrachloride, $CCl_4$, is also a colorless liquid and boils at 76° C. Perchlorethylene, an unsaturated chlorinated hydrocarbon is also known as tetrachlorethylene and has the formula $CCl_2=CCl_2$. It is a colorless liquid boiling at 121° C. Among the chlorinated hydrocarbons perchlorethylene is preferred in the practice of this invention since its effectiveness is superior and it is non-flammable and has a low toxicity. Trichlorethylene should be avoided in practicing this invention since it is readily dehydrochlorinated on mixing with an alkali metal base and forms explosive peroxide compounds.

The co-solvents chosen as components of the inventive compositions must possess the property of dissolving the alkali metal base and should be miscible in substantial proportions with the chlorinated hydrocarbons. Many of the aliphatic alcohols such as unsubstituted alcohols and ether-alcohols are effective co-solvents for alkali metal bases and the aforementioned chlorinated hydrocarbons, such as ethanol, iso-propyl alcohol, n-propyl alcohol, n-butyl alcohol, isobutyl alcohol, secondary butyl alcohol, the amyl alcohols, methyl Cellosolve (ethylene glycol monomethyl ether), iso-propyl Cellosolve (ethylene glycol mono-isopropyl ether), methyl Carbitol (diethylene glycol monomethyl ether), iso-propyl Carbitol (diethylene glycol isopropyl ether), polyethylene glycol, a poly ether glycol, methanol, ethylene glycol monopropyl ether, ethylene glycol monobutyl ether, diethylene glycol propyl ether, diethylene glycol butyl ether, propylene glycol methyl ether, propylene glycol ethyl ether, dipropylene glycol methyl ether, propylene glycol, dipropylene glycol, tripropylene glycol, Cellosolve (ethylene glycol monoethyl ether), Carbitol (diethylene glycol monoethyl ether), and the like. Various other alcohols, ether-alcohols, and even ring compounds such as morpholine and the like possess co-solvent properties for an alkali metal base on the one hand and methylene chloride, carbon tetrachloride, or perchlorethylene on the other.

In the aforementioned compositions, particularly those containing enough alkali metal base to brighten a tin plated base metal, the use of a corrosion inhibitor is found to be advantageous. The following compounds have been found to be effective in reducing the corrosion or brightening of tin surfaces when provided as components of compositions of this invention: Hydroquinone, pyrogallol, pyrogallic acid, nitrobenzene, benzoyl peroxide, furfural, furfuryl alcohol, phenol and cresol.

In practice, the compositions of this invention are conveniently formulated by mixing the co-solvent, chlorinated hydrocarbon, and inhibitor. To this mixture the alkali metal base, either in the dry state or as a concentrated aqueous solution, is added. The composition may be applied to the work free of water or in combination with a small amount of water which improves its cleaning properties. The composition is preferably heated to a temperature of approximately 55°–75° C. and contacted with the silicone resin glaze desired to be removed. After a few minutes have elapsed the silicone resin glaze apparently undergoes a gradual change and upon removing the composition of this invention from the surface of the glaze the silicone resin is completely removed by rinsing with water.

The three major components of this composition are effective over a wide range of proportions and the effectiveness of the mixture diminishes only when the chlorinated hydrocarbon or the alkali metal base is present in a very low percentage. It may be stated generally that the alkali metal base should comprise at least .02% and the chlorinated hydrocarbon 1% by weight of the composition in order to attain a noticeable improvement in glaze removal. The amount of alkali metal base is preferably held below 5% by weight when the silicone resin to be removed is associated with a tin surface or other surface easily attacked by strong alkalies. The proportion of co-solvent in the composition may be varied widely but it is generally necessary to provide enough co-solvent to dissolve the bulk of the alkali metal base present and to effect solution with the other components of the composition. The proportion of chlorinated hydrocarbon similarly varies widely and is determined by the proportions of the other ingredients, and excellent results are attained in some compositions containing as much as 97% by weight perchlorethylene, methylene chloride, or carbon tetrachloride.

Experiments have indicated that unusually fast glaze removal is attained without brightening a tin surface upon which the resin has been deposited as a glaze when ethanol or methyl Cellosolve is provided as co-solvent and the proportion of alkali metal base lies between 0.05% by weight and 1.5% by weight and the chlorinated hydrocarbon comprises 70–95% by weight. When these ideal compositions are contacted with a silicone resin glaze for a few minutes at a temperature of about 75° C. the hard baked resin is changed and is easily removed in a subsequent water rinse. The stability and anti-corrosion properties of these compositions are enhanced by addition of 0.25–1.0% phenol.

The remarkable ability of the inventive compositions to condition hardened silicone resin glazes so that they are removable by water does not appear to result from any property of an individual component of the composition. Caustic soda and similar alkali metal bases are without effect on long-chain silicone glazes and the chlorinated hydrocarbons alone similarly do not attack such glazes even after long periods of contact at elevated temperature. The co-solvents mentioned herein are similarly ineffective when used alone. Moreover, the combinations of such co-solvents with said chlorinated hydrocarbons are either without effect or react with long-chain silicone resin glazes very slowly and incompletely and do not provide removal. The combination of alkali metal bases with the co-solvents listed herein in most cases react slowly with the long-chain silicone resin glazes and tend to produce undesirable bright tin surfaces. It is only when all three components are incorporated into the combination that the mixture acts rapidly and thoroughly effecting complete removal of the silicone resin glaze. Strangely enough the inventive composition retains its effectiveness even when the proportion of chlorinated hydrocarbon exceeds 90%. While the reasons for the unusual action of the inventive compositions are not known, it is apparent that the silicone resin glaze is not dissolved by the compositions of this invention but is attacked physically or chemically or possibly physically and chemically in such a way that the attacked glaze is so readily soluble in water that it may be removed by rinsing with water without wiping or rubbing. The unique and unexpected nature of the way in which the processes and compositions of the present invention operate will appear from the specific examples set forth below.

*Example 1.*—A silicone resin marketed under the trade-name "Pan Glaze" by the Dow-Corning Corporation, Midland, Michigan, was applied to the surface of a tin-plated bread pan and the pan was placed in a baking oven for the duration of a normal baking cycle and then removed. The pan was then immersed for 15 minutes in a solution containing .60 gram NaOH, 32.7 grams ethanol and 66.7 grams perchlorethylene and the solution maintained at about 75° C. Complete silicone glaze removal was attained on a subsequent water rinse followed by a slight wiping. No tin attack was apparent.

*Example 2.*—The procedure of Example 1 was followed using 0.1 gram NaOH, 5.2 grams ethanol and 94.7 grams perchlorethylene. A complete silicone glaze removal was attained without wiping and the tin attack was slight.

*Example 3.*—The procedure of Example 1 was followed using 1.0 gram NaOH, 6.0 grams methyl Cellosolve and 93.0 grams perchlorethylene. Silicone removal was complete in 15 minutes without wiping and there was no observable tin attack.

*Example 4.*—The procedure of Example 1 was followed, using 0.6 gram NaOH, 0.9 gram water, 16.5 grams methyl Cellosolve, 1.0 gram phenol and 81.0 grams perchlorethylene. Silicone removal was complete in 4 minutes at 70° C. without wiping and there was no indication of tin attack.

*Example 5.*—The procedure of Example 1 was followed, using the same composition as given in Example 1 except the 0.6 gram NaOH was replaced with 0.6 gram sodium metholate. Silicone removal was complete in 10 minutes at 75° C. without wiping and there was no tin attack.

I claim:

1. A composition for treating a hardened silicone resin glaze to make it water removable which consists essentially by weight of .02–5% alkali metal hydroxide, 1–97% chlorinated hydrocarbon selected from the group consisting of methylene chloride, carbon tetrachloride, and perchlorethylene, and the balance consisting of a co-solvent selected from the group consisting of ethylene glycol monomethyl ether, diethylene glycol monomethyl ether, ethylene glycol monopropyl ether, ethylene glycol monobutyl ether, diethylene glycol monopropyl ether, diethylene glycol butyl ether, propylene glycol methyl ether, propylene glycol ethyl ether, dipropylene glycol methyl ether, ethylene glycol monoethyl ether, and diethylene glycol monoethyl ether.

2. A composition for treating a hardened silicone resin glaze to make it water removable without wiping which comprises by weight .05–5.0% alkali metal base selected from the group consisting of sodium hydroxide and potassium hydroxide, 70%–95% chlorinated hydrocarbon selected from the group consisting of methylene chloride, carbon tetrachloride, and perchlorethylene, and 3.5%–29.95% monohydric glycol ether, selected from the group consisting of ethylene glycol monomethyl ether, diethylene glycol monomethyl ether, ethylene glycol monopropyl ether, ethylene glycol monobutyl ether, diethylene glycol monopropyl ether, diethylene glycol butyl ether, propylene glycol methyl ether, propylene glycol ethyl ether, dipropylene glycol methyl ether, ethylene glycol monoethyl ether, and diethylene glycol monoethyl ether.

3. A composition for treating a hardened silicone resin glaze to make it removable without wiping from a metal surface by treatment with water, which consists essentially by weight of .05–1.5% alkali metal hydroxide, 70–95% perchlorethylene, and 3.5–29.95% ethylene glycol monomethyl ether.

4. A composition for treating a hardened silicone resin glaze consisting essentially by weight of:

| | Per Cent |
|---|---|
| NaOH | .05–1.5 |
| Perchlorethylene | 70–95 |
| Ethylene glycol monomethyl ether | 3.5–29.95 |
| Phenol | .25–1.0 |

5. In a process for removing a hardened silicone resin glaze from an associated article having a surface containing tin without appreciably attacking said surface, the steps which comprise contacting the hardened silicone resin with a composition consisting essentially by weight of about .02–5% alkali metal hydroxide, 1–97% by weight chlorinated hydrocarbon selected from the group consisting of methylene chloride, carbon tetrachloride, and perchlorethylene, and substantially the balance co-solvent selected from the group consisting of ethylene glycol monomethyl ether, diethylene glycol monomethyl ether, ethylene glycol monopropyl ether, ethylene glycol monobutyl ether, diethylene glycol propyl ether, diethylene glycol butyl ether, propylene glycol methyl ether, propylene glycol ethyl ether, dipropylene glycol methyl ether, ethylene glycol monoethyl ether, and diethylene glycol monoethyl ether, said co-solvent being capable of and present in sufficient amount to dissolve substantially all of said alkali metal base and to mix with said chlorinated hydrocarbon to form a homogeneous liquid, maintaining said contact for a time period sufficient to modify the hardened silicone resin glaze, maintaining said composition at about 55°–75° C. during the contact period, separating the aforesaid composition from the article, and removing the modified silicone resin by rinsing the surface of said article with water.

6. The method of removing hardened silicone resin glaze from a metal base having a surface containing tin without causing appreciable tin attack, comprising contacting the resin with a composition consisting essentially by weight of about .02–5% sodium hydroxide and 1–97% perchlorethylene in the balance of ethylene glycol monomethyl ether, maintaining said composition at about 55–75° C. for a period sufficient to modify the hardened silicone resin glaze, removing the base and glaze from said composition, contacting the modified resin with water, and removing the resulting material from said base.

7. A composition for treating a hardened silicone resin glaze to make it removable by rinsing with water which comprises approximately 1% NaOH, 6% ethylene glycol monomethyl ether and 93% perchlorethylene by weight.

8. A composition for treating a hardened silicone resin glaze to make it removable by rinsing with water which comprises approximately 0.6% NaOH, 0.9% water, 16.5% ethylene glycol monomethyl ether, 1.0% phenol and 81.0% perchlorethylene by weight.

9. A composition for treating a hardened silicone resin glaze to make it removeable by rinsing with water which comprises approximately 0.6% sodium methylate, 0.9% water, 16.5% ethylene glycol monomethyl ether, 1.0% phenol, and 81.0% perchlorethylene by weight.

IRA J. DUNCAN.

References Cited in the file of this patent

UNITED STATES PATENTS

| Number | Name | Date |
|---|---|---|
| 1,501,086 | Zimmerman | July 15, 1924 |
| 2,206,776 | Jaschke | July 2, 1940 |
| 2,212,761 | Webster | Aug. 27, 1940 |
| 2,432,665 | Hyde | Dec. 16, 1947 |
| 2,445,064 | Hall et al. | July 13, 1948 |

FOREIGN PATENTS

| Number | Country | Date |
|---|---|---|
| 5,541 | Great Britain | 1902 |